March 5, 1963  J. C. DAVIS, JR  3,080,525
FREQUENCY MULTIPLIERS

Filed Dec. 3, 1959  2 Sheets-Sheet 1

INVENTOR
JAMES C. DAVIS JR.
BY
ATTORNEY

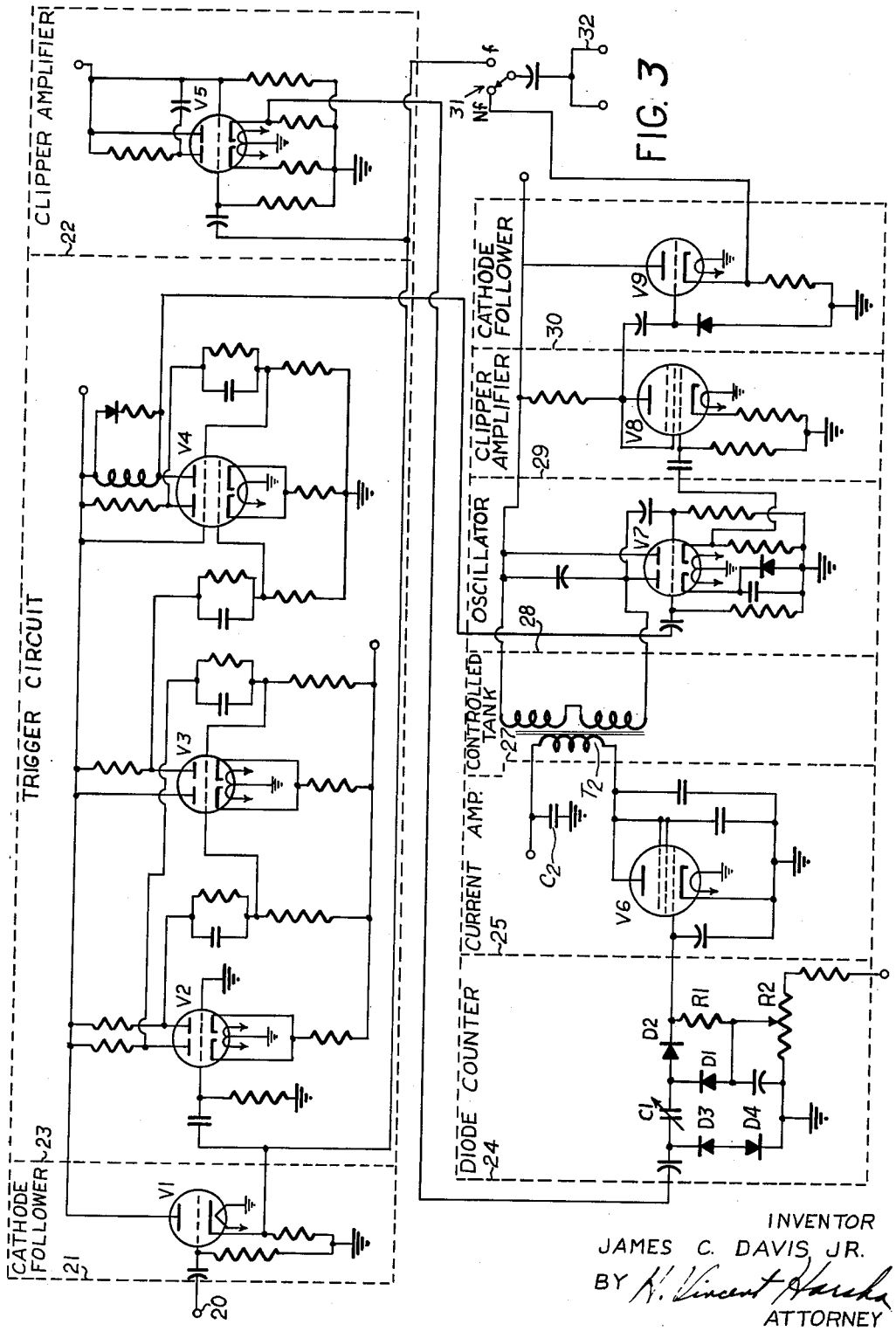

United States Patent Office 3,080,525
Patented Mar. 5, 1963

3,080,525
FREQUENCY MULTIPLIERS
James C. Davis, Jr., Carlisle, Mass., assignor to Raytheon Company, Lexington, Mass., a corporation of Delaware
Filed Dec. 3, 1959, Ser. No. 856,999
5 Claims. (Cl. 328—38)

This invention relates to frequency multipliers generally, and more particularly to a frequency multiplier which will operate accurately over wide frequency ranges.

In many instances it is desirable to obtain a frequency measurement in electrical circuits where conditions of low frequency and narrow bandwidth exist. However, a serious drawback is presented when measurement by means of a standard frequency meter is attempted, for as the bandwidth of the circuit decreases, the meter accuracy deteriorates. This problem has become increasingly prevalent in instances where the development and use of high Q filters is concerned, since some applications require filters with five, two, and even one cycle bandwidths at frequencies as low as 20 kc. To determine the bandwidth of these filters, it is necessary to measure frequency at the half-power points with a frequency meter.

Frequency meters now in use will count to an accuracy of ± one count, regardless of frequency or time. With bandwidths of greater than 10 cycles the counter is good to ±0.1 bandwidth, but with decreasing bandwidths, accuracy deteriorates until, for measurements relating to one cycle high Q filters, the error is equal to the bandwidth and no accurate measurements can be made.

In taking measurements where high Q filters with narrow bandwidth characteristics are concerned, if the frequency of the filter drive amplifier could be multiplied by a given number, for example ten, the accuracy of the measurement obtained with a frequency meter would also be multiplied by ten, as the counter accuracy is normally independent of frequency. This frequency multiplication would also prove useful in other applications where the frequency measurement of a narrow bandwidth circuit is required. However, the frequency multipliers presently available are not suitable for multiplying frequency over wide ranges.

A primary object of this invention is to provide an improved frequency multiplier.

Another object of this invention is to provide a frequency multiplier for multiplying frequency over wide ranges.

A further object of this invention is to provide a frequency multiplier which may be readily used with a standard frequency meter to provide a rapid and accurate frequency measurement in narrow bandwidth circuits.

With the foregoing and other objects in view, the invention resides in the following specifications and appended claims, certain embodiments of which are illustrated in the accompanying drawings in which:

FIGURE 3 shows a circuit diagram of the multiplier of the present invention.

Figure 1:
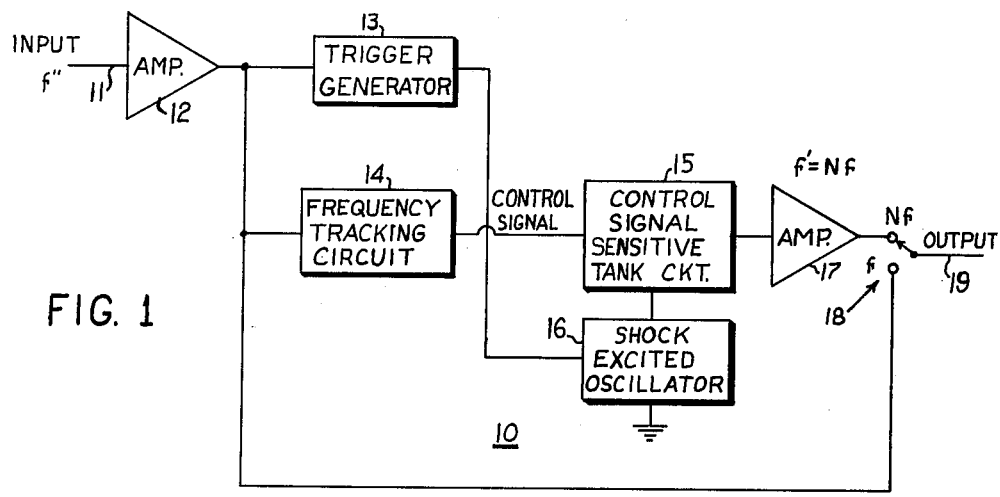
FIGURE 1 shows a block diagram of the basic multiplier of the present invention.

Basically, the frequency multiplier of this invention consists of a shock excited oscillator triggered by a trigger circuit and tracked by a frequency tracking circuit which provides a control signal to a signal controlled tank circuit. The signal controlled tank circuit serves as the oscillator tank and controls the frequency of the output signal. A better understanding of the invention will be had by referring to FIGURE 1 where the frequency multiplier indicated generally at 10 comprises an input 11 through which a given signal to be multiplied is supplied to an amplifier 12. The output of the amplifier 12 is supplied to the inputs of a trigger pulse generator 13 and a frequency tracking circuit 14. The output signal from the amplifier 12 is also supplied by means of a separate path to the $f$ contact of a two-position switch 18. Frequency tracking circuit 14 produces a control signal which is fed to a signal controlled variable tank circuit 15 that acts as the output tank circuit for a shock excited oscillator 16. Shock excited oscillator 16 is actuated by pulses from the trigger generator 13. The output from oscillator 16 is fed through the controlled tank circuit 15, which provides an output signal having a frequency which is a multiple of the frequency of the signal fed to input 11. The multiplied signal is then passed from the controlled tank circuit 15 through an amplifier 17 and the $nf$ contact of the two position switch 18 to an output 19.

In the operation of the circuit of FIGURE 1, variations of the input frequency are sensed by the frequency tracking circuit 14, and the control signal passed to the controlled tank circuit 15 is varied accordingly. The resonant frequency of the controlled tank circuit is determined by the control signal from the frequency tracking circuit, so that the output from the shock excited oscillator through the tank circuit is maintained at a frequency which is a predetermined multiple of the frequency of the input signal fed to input 11.

Figure 2:
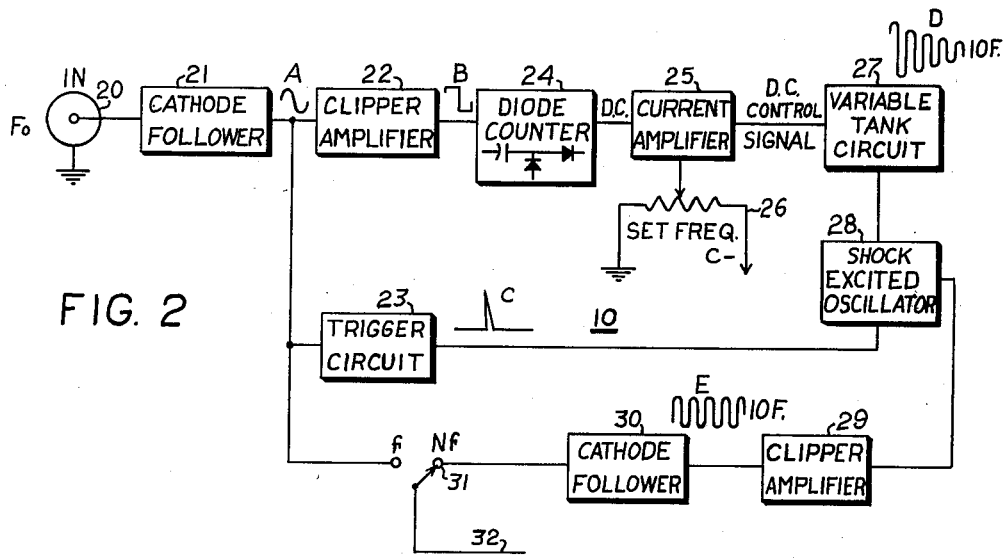
FIGURE 2 shows a block diagram of an embodiment of the multiplier of the present invention.

Referring now to the embodiment of the invention illustrated by FIGURE 2, the frequency multiplier 10 comprises an input 20 through which a given signal to be multiplied is supplied from a voltage source to a cathode follower 21. The output of cathode follower 21 is applied to the input of a clipper amplifier 22 and to a trigger circuit 23. The signal from the cathode follower 21 is also supplied by a separate path to the $f$ contact of a two position switch 31. The output of amplifier 22 is fed to a diode counter 24 which in turn provides D.C. signals to a current amplifier 25. A variable potentiometer 26 controls the bias of current amplifier 25 and thereby determines the amplitude of the D.C. current appearing at the output of the current amplifier. This D.C. output is provided as a control current to a D.C. current controlled variable tank circuit 27. Controlled tank circuit 27 serves as the tank circuit for an oscillator 28 which is excited by pulses from the trigger circuit 23. The signal from oscillator 28 is passed through a clipper amplifier 29 and a cathode follower 30 to the $nf$ contact of the two position switch 31 which selectively supplies a signal to output 32. Clipper amplifier 29 and cathode follower 30 comprise an output section which receives the output signal from oscillator 28 and supplies it to switch 31.

FIGURE 3 shows the over-all circuit diagram of the frequency multiplier of the invention. Tube $V_1$ comprises the cathode follower 21 which receives the input signal from multiplier input 20. The cathode follower output signal shown at A in FIGURE 2 is fed through limiter tubes $V_2$ and $V_3$ to tube $V_4$. These tubes are coupled together to form trigger circuit 23. The limiter tubes $V_2$ and $V_3$ convert the sinusoidal waveform from the output of the cathode follower into a positive and negative going square wave and feed it to the grid of tube $V_4$. These limiters also insure that this positive and negative going waveform drops and rises sharply between its negative and positive peak values.

Tube $V_4$ with its associated circuitry comprises a standard Schmidt trigger circuit which is well known to the prior art. This circuit provides a pulse output coincident with either the negative or positive crossing of a given voltage reference, in this case zero volts, by the input voltage. The output of tube $V_4$ is coupled to the grid circuit of tube $V_7$.

The sinusoidal voltage from cathode follower 21 is also passed to tube $V_5$, and through a separate path to the $f$ contact of switch 31. Tube $V_5$ is the clipper amplifier 22 and acts to clip the output voltage of cathode follower 21 to provide the waveform shown at B in FIGURE 2. Tube $V_5$ is coupled to a diode rate counter 24 formed by diodes $D_1$ and $D_2$, resistor $R_1$ and variable capacitor $C_1$. Diodes $D_3$ and $D_4$ form a Zener limiter which provides a square wave of fixed amplitude to drive the diode rate counter 24. The D.C. output current from the diode counter is fed to the grid of tube $V_6$ which comprises the current amplifier 25, and then to the controlled tank circuit 27. A variable potentiometer $R_2$ sets the bias on tube $V_6$ and thereby controls the current to the tank circuit 27 and thus the resonant frequency of the tank circuit. By varying the setting of potentiometer $R_2$, the output signal from the tank circuit may be varied in frequency to obtain a signal frequency which is a desired multiple of the frequency of the signal fed to input 20. The D.C. control current which is initially provided by the diode counter 24 is equal to $I=EFC$ where I is the current through resistor $R_1$ which biases tube $V_6$, E is the Zener limiter voltage, and C is the capacitance of capacitor $C_1$. This current is a function of the frequency of the input signal to input 20.

Tube $V_6$ is coupled to the controlled tank circuit 27 which is formed by a D.C. current controlled saturable reactor $T_1$ and a capacitor $C_2$. It would also be feasible to provide the controlled tank circuit 27 with a fixed inductance and a suitable D.C. current controlled variable capacitor in place of the saturable reactor and fixed capacitor shown by FIGURE 3. The amplitude of the D.C. control current from tube $V_6$ determines the resonant frequency of the controlled tank circuit, and the controlled tank circuit in turn serves as the tank for oscillator 28 comprised of tube $V_7$ and its associated circuitry. Pulses from trigger circuit 23, shown at C in FIGURE 2, are received at the grid of tube $V_7$ and act to trigger the oscillator into operation. The output signal produced by oscillator 28 is regulated by the output tank to a frequency which is a multiple of that of the multiplier input signal. This oscillator output, shown at D in FIGURE 2, is fed to a clipper amplifier 29 comprised of tube $V_8$. The signal from tube $V_8$, shown at E in FIGURE 2, is supplied to the grid of tube $V_9$ which forms cathode follower 30, and then in turn to the $nf$ contact of two position switch 31. Switch 31 can be utilized to provide a signal in output 32 which is either equal in frequency to the multiplier input signal, or which has a frequency which is a multiple of the frequency of the input signal.

A prototype constructed in accordance with the present invention tracks over approximately a two-to-one frequency range over most of the band from 20 kc. to 100 kc., and over a minimum of ±5% anywhere within this band. It is conceivable that these operational characteristics may be improved by the use of improved D.C. controlled oscillator tank circuits.

It will be readily apparent to those skilled in the art that the present invention provides a simple and effective frequency multiplier which is operable over a wide range of frequencies. This invention may be subject to numerous modifications well within the purview of the inventor, who only intends to be limited to a liberal interpretation of the specification and the appended claims.

I claim:
1. A frequency multiplier comprising input means responsive to a signal of a frequency to be multiplied, a shock excited oscillator, trigger means coupled to said input means for exciting the oscillator, a current controlled tank circuit serving as the tank circuit for said oscillator, a diode counter, and output means for receiving the output signal from said oscillator, said diode counter supplying a direct current control current which is a function of the frequency of the input voltage to regulate the resonant frequency of said current controlled tank circuit to provide an output signal having a frequency which is a multiple of the frequency of said input voltage.

2. A frequency multiplier comprising input means responsive to a signal of a frequency to be multiplied, a shock excited oscillator, a Schmidt trigger circuit coupled to said input means for exciting the oscillator, a current controlled tank circuit serving as the tank circuit for said oscillator, a diode counter coupled to said input means for supplying a direct current control current to regulate the resonant frequency of said oscillator tank to provide an output signal having a frequency which is a multiple of the frequency of said input voltage, means to regulate the direct current control current from said diode counter, and an output circuit for receiving the output signal from said oscillator.

3. A frequency multiplier comprising input means responsive to a signal of a frequency to be multiplied, a cathode follower coupled to said input means, a shock excited oscillator, trigger means coupled to said cathode follower for exciting the oscillator, a direct current controlled tank circuit serving as the tank circuit for said oscillator, means coupled to said cathode follower for supplying a direct current control current to regulate the resonant frequency of said oscillator tank, an output circuit for receiving the output signal from the oscillator, said oscillator output signal being regulated to a frequency which is a multiple of that of the input voltage by the oscillator tank, a two position switch in said output circuit, said switch having an $nf$ contact which receives the signal from the shock excited oscillator and an $f$ contact which receives a signal equal in frequency to that of the input voltage from the cathode follower.

4. A frequency multiplier comprising input means responsive to a signal of a frequency to be multiplied, a shock excited oscillator, trigger means coupled to said input means for exciting the oscillator, a direct current controlled saturable reactor and a non-variable capacitor serving as the tank circuit for said oscillator, counting means coupled to said input means for supplying a direct current control current to regulate the resonant frequency of said oscillator tank, means to regulate the direct current control current from said counting means, and an output circuit for receiving the output signal from said oscillator, said oscillator tank circuit being regulated so as to hold the output signal to a frequency which is a pre-set multiple of that of the input voltage.

5. A frequency multiplier comprising input means responsive to a signal of a frequency to be multiplied, a shock excited oscillator, trigger means coupled to said input means for exciting the oscillator, a direct current controlled variable capacitor and a non-variable inductance serving as the tank circuit for said oscillator, counting means coupled to said input means for supplying a direct current control current to regulate the resonant frequency of said oscillator tank, means to regulate the direct current control current from said counting means, and an output circuit for receiving the output signal from said oscillator, said oscillator tank circuit being regulated so as to hold the output signal to a frequency which is a pre-set multiple of that of said input voltage.

References Cited in the file of this patent

UNITED STATES PATENTS

| | | |
|---|---|---|
| 2,768,299 | Boff | Oct. 23, 1956 |
| 2,811,639 | Sontheimer | Oct. 29, 1957 |
| 2,839,684 | Vaniz | June 17, 1958 |
| 2,897,352 | Vaniz | July 28, 1959 |
| 2,899,601 | Simmons | Aug. 11, 1959 |
| 2,926,311 | Gabor | Feb. 23, 1960 |